US012793538B2

(12) United States Patent
Garceau et al.

(10) Patent No.: US 12,793,538 B2
(45) Date of Patent: Nov. 10, 2026

(54) VEHICLE LEVELING ASSEMBLY WITH MOBILE DEVICE

(71) Applicant: NORCO INDUSTRIES, INC., Compton, CA (US)

(72) Inventors: Bernard F. Garceau, Vandalia, MI (US); Leonard Douglas Yoder, Elkhart, IN (US)

(73) Assignee: NORCO INDUSTRIES, INC., Compton, CA (US)

(*) Notice: Subject to any disclaimer, the term of this patent is extended or adjusted under 35 U.S.C. 154(b) by 41 days.

(21) Appl. No.: 19/084,917

(22) Filed: Mar. 20, 2025

(65) Prior Publication Data

US 2025/0218282 A1 Jul. 3, 2025

Related U.S. Application Data

(63) Continuation of application No. 18/506,796, filed on Nov. 10, 2023, now Pat. No. 12,283,179, which is a (Continued)

(51) Int. Cl.

*G08C 17/02* (2006.01)
*B60S 9/02* (2006.01)
(Continued)

(52) U.S. Cl.

CPC ................ *G08C 17/02* (2013.01); *B60S 9/02* (2013.01); *B60S 9/12* (2013.01); *G01C 9/08* (2013.01); *G05D 1/0016* (2013.01); *G05D 1/223* (2024.01)

(58) Field of Classification Search

CPC ... G08C 17/02; B60S 9/02; B60S 9/12; G01C 9/08; G05D 1/0016; G05D 1/223

See application file for complete search history.

(56) References Cited

U.S. PATENT DOCUMENTS

| | | | |
|---|---|---|---|
| 5,143,386 | A | 9/1992 | Uriarte |
| 6,050,573 | A | 4/2000 | Kunz |

(Continued)

OTHER PUBLICATIONS

Freescale Semiconductor, Inc.; 6-Axis Xtrinsic Sensor with Integrated Linear Accelerometer and Magnetometer; Data Sheet: Advance Information Document No. FXOS8700CQ, Rev. 1, Jun. 2012; pp. 1-87; US.

(Continued)

*Primary Examiner* — Michael V Kerrigan

(74) *Attorney, Agent, or Firm* — Vorys, Sater, Seymour and Pease LLP; Rex W. Miller, II

(57) ABSTRACT

A system for correcting an attitude of a structure having one or more jacks affixed about the structure and operable to change the attitude of the structure. The system includes a remote device and a controller. The remote device includes a multi-axis digital sensor that is configured to measure an orientation of a selected portion of the structure at which the remote device is placed, and a processor configured to determine an adjustment of the one or more jacks based on the measurements received from the multi-axis digital sensor. The controller is in wireless communication with the remote device and configured to cause adjustment of the one or more jacks in order to change the attitude of the structure into a desired attitude based on data indicative of the adjustment received from the processor.

20 Claims, 8 Drawing Sheets

Related U.S. Application Data continuation of application No. 17/563,518, filed on Dec. 28, 2021, now Pat. No. 11,854,380, which is a continuation of application No. 16/504,566, filed on Jul. 8, 2019, now Pat. No. 11,208,082, which is a continuation of application No. 15/438,368, filed on Feb. 21, 2017, now Pat. No. 10,343,653, which is a continuation-in-part of application No. 14/854,871, filed on Sep. 15, 2015, now abandoned.

(60) Provisional application No. 62/050,590, filed on Sep. 15, 2014.

(51) Int. Cl.

| | |
|---|---|
| ***B60S 9/12*** | (2006.01) |
| ***G01C 9/08*** | (2006.01) |
| ***G05D 1/00*** | (2006.01) |
| ***G05D 1/223*** | (2024.01) |

(56) References Cited

U.S. PATENT DOCUMENTS

| | | | | |
|---|---|---|---|---|
| 6,584,385 | B1 | 6/2003 | Ford et al. | |
| 6,885,924 | B2 | 4/2005 | Ford et al. | |
| 7,193,381 | B2 | 3/2007 | Ford et al. | |
| 7,199,534 | B2 | 4/2007 | Ford et al. | |
| 7,208,896 | B2 | 4/2007 | Ford et al. | |
| 7,617,018 | B2 | 11/2009 | Ford et al. | |
| 2008/0142768 | A1 * | 6/2008 | Thorpe | B60S 9/12<br>254/423 |
| 2009/0127531 | A1 | 5/2009 | Bakshi | |
| 2014/0214283 | A1 | 7/2014 | Maurer | |

OTHER PUBLICATIONS

Lippert Components, Linc Remote System Owner's Manual. 8 pages.

Lippert Components, Level up automatic leveling system. Jul. 24, 2013. 4 pages.

* cited by examiner

VEHICLE LEVELING ASSEMBLY WITH MOBILE DEVICE

CROSS-REFERENCE TO RELATED APPLICATION

This patent application is a continuation of U.S. patent application Ser. No. 18/506,796 filed Nov. 10, 2023, which is a continuation of U.S. patent application Ser. No. 17/563,518 filed Dec. 28, 2021, which is a continuation of U.S. patent application Ser. No. 16/504,566 filed on Jul. 8, 2019, which is a continuation of U.S. patent application Ser. No. 15/438,368, filed on Feb. 21, 2017, which is a continuation in part of U.S. patent application Ser. No. 14/854,871, filed on Sep. 15, 2015, which claims priority to and the benefit of provisional patent application 62/050,590 filed on Sep. 15, 2014, all of which are incorporated by reference herein in their entirety.

TECHNICAL FIELD

The disclosures herein relate in general to control of the orientation of structures in regard to a reference angle. More particularly, aspects herein relate to using a multi-axis digital sensor for feedback for controlling the extension or retraction of jacks to effect such orientation.

BACKGROUND

Large structures or vehicles which remain in place for extended periods of time (such as recreational vehicles, or RVs) can benefit from being leveled with respect to the ground on which they are placed. To level such vehicles, a plurality of jacks connected to the frame of the structure are provided, which extend or retract to raise, lower, and adjust the attitude of the structure. Solutions for automatic vehicle leveling rely upon user-actuated or semi-automatic leveling controls which provide feedback. Some automatic solutions have been proposed as well. These solutions utilize two axis tilt sensors which provide analog signals to controllers or signaling components to determine the pitch or roll of the structure with respect to a predefined reference line (e.g., direction of gravity) or plane (e.g., plane perpendicular to direction of gravity).

SUMMARY

Presently disclosed is an assembly for correcting an attitude of at least a selected portion of a structure. In an embodiment, the assembly includes a controller affixed to a structure operatively coupled with one or more jacks operable to change the attitude of the structure; and a remote device configured to communicate wirelessly with the controller to change the attitude of a selected portion of the structure, In embodiments, the remote device includes a user interface operable to permit the user to initiate an attitude correction operation, and a multi-axis digital sensor providing readings from three or more axes describing an angular orientation of the selected portion of the structure, and a processor configured to receive the readings from the digital sensor and communicate jack control signals to the controller to extend and retract the one or more jacks based on the digital signals to move the selected portion of the structure into a desired attitude.

Also disclosed is a method for adjusting an attitude of a movable structure. In embodiments, the method includes: receiving in a processor, from a multi-axis digital sensor of a remote device, readings describing an angular orientation of a selected portion of a structure with respect at least two axes relative to the remote device, calculating with the processor an angular orientation of the selected portion of the structure along a longitudinal pitch axis and a lateral roll axis of the structure based on the reading from the multi-axis digital sensor; and communicating jack control signals determined by the processor to a controller affixed to the structure to extend and retract one or more jacks based on the digital signals to move the selected portion of the structure into a level attitude with respect to the longitudinal roll axis and the lateral roll axis of the structure.

In other embodiments an assembly for correcting the attitude of at least a selected portion of a structure includes a controller operatively coupled with one or more jacks operable to change the attitude of a structure and a multi-axis digital sensor operatively coupled with the controller, the multi-axis digital sensor providing readings from three or more axes. The multi-axis digital sensor provides digital signals to the controller describing an angular orientation of at least the selected portion of the structure, and the controller moves a selected portion of the structure into a desired attitude by transmitting jack control signals to extend and retract the one or more jacks, the control signals based on the digital signals.

In some embodiments there is also provided a method for analyzing the attitude of a structure relative, the method comprising analyzing the current angular orientation of the structure using a 6-axis digital sensor to produce data related to the current angular orientation of the structure; transmitting the data related to the current angular orientation of the structure to a controller operatively coupled to one or more jacks for moving the structure from the current angular orientation of the structure to a desired angular orientation of the structure; and comparing the data related to the current angular orientation of the structure to the desired angular orientation of the structure.

BRIEF DESCRIPTION OF DRAWINGS

To better understand and appreciate the invention, refer to the following detailed description in connection with the accompanying drawings.

DETAILED DESCRIPTION

Figure 1:
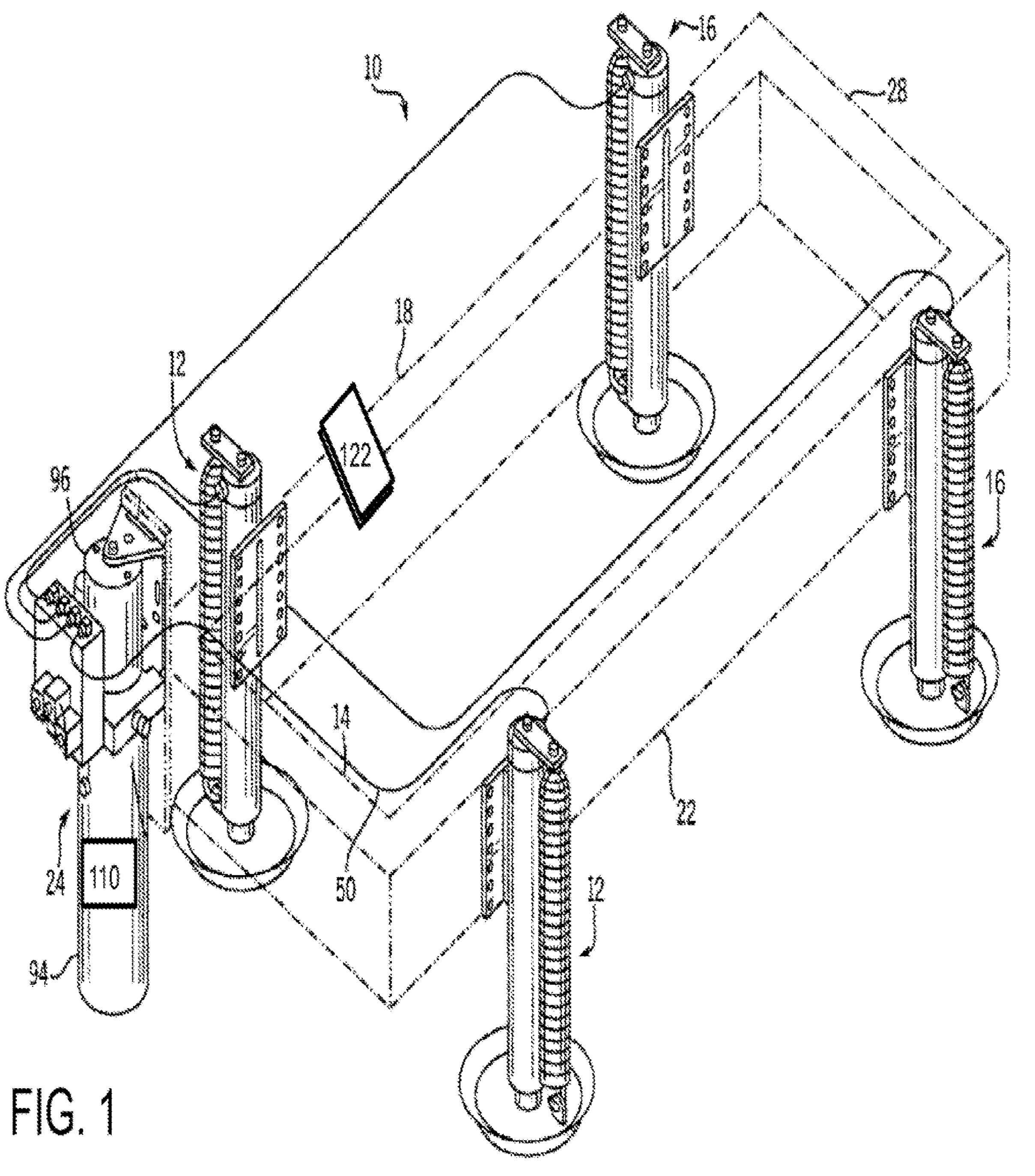
FIG. 1 is an isometric view of the vehicle leveling system installed on the frame of a vehicle such as a recreational vehicle.

A leveling assembly and method for analyzing the attitude of a platform or structure such as a motor vehicle is described. A control system actuates leveling jacks attached to or in contact with the platform or structure using feedback from a multi-axis digital sensor. The multi-axis digital sensor reads orientation data in two or more axes. In specific embodiments, the multi-axis digital sensor reads orientation data in three or more axes. In an embodiment, the multi-axis digital sensor can be one of a 3-axis gyroscope or a 3-axis accelerometer. In an embodiment, the multi-axis digital sensor can be a 6-axis digital sensor. The 6-axis digital sensor can include a 3-axis gyroscope and 3-axis accelerometer and a processor for interpreting motion data from the gyroscope and accelerometer. Using data from the gyroscope and accelerometer, the attitude (e.g., pitch, roll, or other relative metrics) of the structure can be calculated, and the accelerometer can be used to determine the rate of change of the attitude. Attitude and rate of change can be measured in reference to any point, line, or plane pre-defined or selected while in progress.

With this arrangement, the leveling controller and associated systems can be programmable to allow for customization. Included in such leveling systems are memory, temperature adjustments, and directional inputs. The accelerometer can be programmable, and in embodiments includes ranges of, for example, ±2 g, ±4 g, ±8 g, and ±16 g. The multi-axis digital sensor can further include on-chip 16-bit ADCs, programmable digital filters, a precision clock with small drift (e.g., 1% or less across a temperature range such as −40° C. to 85° C.), an embedded temperature sensor, and programmable interrupts. The sensor can further include I2C and SPI serial interfaces, a VDD operating range of 1.71 to 3.6V, and a separate digital IO supply, VDDIO from 1.71V to 3.6V. Sensor communication can occur with registers using, e.g., I2C at 400 kHz or SPI at 1 MHz. In alternative or complementary embodiments, the sensor and interrupt registers may be read using SPI at 20 MHz. Due to the mobile application, the sensor can also be shock-resistant (e.g., supporting 10,000 g shock reliability).

Systems and methods herein can also include security features. Such features can include security codes having lock-out functionality that lock the system down in a level position (in a fully static position or allowing automatic re-leveling but no other activity) to prevent tampering with the vehicle level, theft, etc.

Level sensors can be integrated, for example, to the jacks and an automatic control device or user control interface to engage or disengage jack movement or various signals to a user related to the status of a leveling operation.

Various components can be integrated with the control system in addition to the multi-axis digital sensor. The sensor can be connected to a controller having various communication ports (wired and/or wireless), one or more processors, memory (RAM and/or storage), clocks or timers, motors, display devices, and other components typically utilized with jack systems (e.g., hydraulic, electromechanical) and associated controllers.

While embodiments described herein relate at times to leveling assemblies or techniques in a recreational vehicle application, one of ordinary skill in the art will recognize such are readily adaptable to other leveling applications and may be utilized with any suitable structure for the purpose of leveling that structure.

Using information from the multi-axis digital sensor, the controller modifies the jack extension distances and rates to respond to vehicle dynamics and vehicle attitude. Such modifications may be based upon temperature, and can include, e.g., slowing of the extension rate or pausing the extension due to elevated temperatures. Additionally, the rate may either increase or decrease speeds based upon a rate of change of vehicle dynamics or attitude. Still further, the rate of extension may increase or decrease speeds, or even pause, based upon additional factors such as noise or scale factor. Additional modifications may include retracting a jack to re-balance or redistribute a load or load component in a more desirable manner. The sensitivity of the multi-axis digital sensor and controller can be calibrated. The sample rate of the multi-axis digital sensor can be constant or dynamic depending on user input (e.g., user dictates rate or rates) or operational context (e.g., initial leveling versus re-leveling, amount of tilt). The controller can limit the speed at which jacks extend, in order to control the amount of angular adjustment in a time period. In alternative or complementary embodiments, the controller can cause one or more jacks to accelerate faster than the standard limited rate to correct for a possible error in operation (e.g., tipping of the structure).

The controller can additionally estimate noise at the multi-axis digital sensor. In an embodiment, noise can be estimated after jack movement has ceased and the system has settled. In further embodiments, the controller can pause or delay any later jack actuation until a static period has passed permitting multiple sensor measurements with the structure and controller constantly oriented. In this fashion, noise estimates can be developed from the variance of successive sensor readings during the static period.

The controller can also change jack drive rates dynamically to control the tilt rate based upon inputs other than tilt angle. For example, if the amount of over or undershoot measured is beyond a specific threshold the drive rate will be decreased. “Level Stop” readings can be part of the adaptive process that indicates whether further changes are necessary for the next level cycle (e.g., whether stop point accuracy can be further improved).

The controller can automatically select between multiple jack grounding procedures based on vehicle conditions (e.g., initial vehicle attitude) and is able to infer jack ground contact from changes in tilt angle without using inputs from discrete sensors. Other sensors related to the jacks can be used as an alternative or supplemental means for inferring jack ground contact or other conditions. As used herein in various embodiments, “grounding” can include first contact between any one jack and a ground surface, all jacks and a ground surface (or other surfaces), contact between a portion of or an entire foot surface of the jack and the ground surface, the condition when one or more jacks reach a pre-determined load threshold (which can coincide with an amount of force sufficient to meet the pre-determined threshold of weight that the jack may safely support), the detection of a load on one or more jacks that is below or above a certain threshold, or various combinations and variants of the above.

In one technique for leveling, the controller levels a vehicle by extending the jacks in pairs parallel to longitudinal pitch and lateral roll vehicle axes. The controller detects and corrects the “worst” axis (the axis around which the greatest out-of-level condition exists) first when commencing a leveling operation. Other techniques, such as where jacks are extended singularly, can also be utilized. The technique can be automatically selected, or selected by a user. In embodiments, the user can control an initial leveling, then turn to automatic selection of leveling thereafter. In the automatic mode, the controller can automatically correct long-term vehicle attitude changes that occur after initial leveling.

The controller can employ adaptive filtering to maximize signal stability based on rate of angular change and estimated signal noise. Through adaptive filtering, controller response to sensor data can be automatically changed depending on at least conditions observed.

Adaptive filtering is accomplished by the controller programmed with a software filter algorithm. In embodiments, the filtering can function as and can be similar to a low pass filter. The order of the filter and the pole location is changed depending on operational mode and noise. When the multi-axis digital sensor is attempting to detect ground contact during initial grounding of the jacks, the multi-axis digital sensor must be very sensitive to changes in movement. While extending the jacks to contact, the order is lowered and the frequency bandwidth is increased. However, when a leveling sequence is in progress and changes are occurring per the predefined rate, higher accuracy can be sought and the signal can be more aggressively filtered.

When levelers are not being actuated (in an initialization mode) the continuous sensor reading is checked for the amount of noise that is present when there is no movement (e.g., "no movement" noise). If a lot of "no movement" noise is sensed, the initial filter value is increased accordingly.

During initial extension of the jacks at the beginning of a leveling operation, to ensure a quick and robust leveling sequence, the controller can stop the jacks after they are firmly engaged with the ground but before the structure is level. The adaptive filtering algorithm allows the controller to recognize ground contact by looking at specific output characteristics received from multi-axis digital sensor. Output characteristics monitored can include noise, rate of change, scale factor and temperature.

The adaptive filter algorithm allows an optimal extension sequence to take place and ensures the most reliable sensing of ground contact. In one embodiment, two jacks are extended simultaneously until the controller senses that the jacks have contacted the ground. The controller then actuates the remaining set(s) of jacks, two at a time, until the controller senses that they have contacted the ground. In response to initial ground contact of all the jacks, the adaptive filter is adjusted and the controller extends each individual jack, one at a time, until all four levelers are firmly grounded.

As is described above, the filter parameters can be changed dynamically to allow a greater sensitivity and to limit excess leveler travel. The order and/or the filter frequency (sample rate and/or shift number) is increased.

Each software mode in the controller can selectively adjust the filter to obtain optimal performance in response, stability, noise immunity, etc. Different variables hold different filtered results and different coefficients depending on modes.

The multi-axis digital sensor is operatively coupled (e.g., capable of communicating with using wired or wireless transmission and reception) to the controller and may be mounted at any point on a vehicle to be leveled. The multi-axis digital sensor is configured to provide digital signals to the controller representing, for example, the degree of longitudinal pitch and lateral roll of a vehicle to which the multi-axis digital sensor is connected. The controller is configured to receive and use those signals to determine vehicle attitude relative to various parameters or values (e.g., a calibrated sensitivity factor and a user-defined zero point). Therefore, a motor vehicle leveler in accordance with these disclosures allows a user or installer to determine which portion(s) of the vehicle will be level relative to gravity despite the location of the multi-axis digital sensor. The multi-axis digital sensor may, therefore, be located anywhere in the vehicle. The module that houses the multi-axis digital sensor includes a visual to allow an installer to properly orient the multi-axis digital sensor in a vehicle, or may be agnostic of a particular arrangement on the vehicle.

In embodiments, systems and methods herein can include temperature compensation to ensure maximum resolution and stability over a wide range of temperature conditions.

In normal operation, the system includes automatic and semiautomatic leveling modes. In both the automatic and the semiautomatic modes, the unit achieves and maintains a level attitude via various leveling algorithms. In embodiments, such algorithms can include a preset relative zero value, an axis-to-level algorithm, and subsequent auto correction feature. The relative zero value can be preset during unit installation and may be used by the controller as a reference value in a "smart" zeroing process. Any relative zero value can be passed to an algorithm that decides how to optimally level the vehicle (e.g., achieve the zero state each time the vehicle is subsequently leveled). Relative zeros can be arbitrary or determined with respect to a point, line (e.g., gravity) or plane (e.g., perpendicular to gravity). The controller can determine an optimum axis sequence that will achieve the zero state with the least overshoot and jack extension, then executes that sequence by transmitting control signals to the jacks. The controller executes that sequence to level the vehicle either automatically or semi-automatically. In the automatic mode, the controller operates the proper jacks according to the optimum sequence. In the semiautomatic mode, the controller indicates to an operator the proper sequence in which to manually actuate the levelers, according to the optimum axis sequence, but the operator may deviate using at least partial manual control.

In at least one embodiment, the system can (but need not) continuously monitor the attitude of the vehicle after each leveling operation. In an embodiment, the system can (but need not) further continue to adjust the jacks as necessary to prevent the vehicle from being tipped out-of-level by such factors as vehicle settling, ground shift, etc. The controller continuously monitors values received from the multi-axis digital sensor and, relative to the preset zero state, adjusts the adaptive filter algorithm. The controller further automatically adjusts the vehicle attitude after the vehicle has moved to an out-of-level attitude. In embodiments, adjustments occur when the vehicle has been out-of-level by a threshold amount for longer than a predetermined minimum time period. As the vehicle approaches level and the controller senses that the multi-axis digital sensor is approaching the preset zero state, the filter order can be decreased and the response increased so that phase delay is reduced. In particular embodiments, no individual jack needs to be actuated during this sequence, only pairs of devices are activated at any one time.

In either fully automatic or semiautomatic mode, the controller can also dynamically change the rate at which the jacks are actuated. This allows the controller to optimize the jack extension rate to suit any particular vehicle, surface condition, and/or output data characteristics of the sensor.

Control aspects herein can be implemented using remote devices, including through use of leveling control or visualization applications installed on computers or mobile devices. For example, a cellular telephone or smart phone "app" can be installed to communicate with a controller and/or the six-axis digital sensor (e.g., wirelessly through BlueTooth™ or WiFi™, wirelessly through the Internet where the controller is internet-enabled, wired through USB, or others). The app can transmit information to and receive information from the controller and/or six-axis digital sensor. With information received from the controller and/or the six-axis digital sensor, text or graphics depicting the attitude of the structure can be provided in real-time when the structure is static or in motion. In alternative or complementary embodiments, the app can include user input options to provide control commands to the controller to manually or semi-automatically effect leveling or other reorientation of the structure. In further alternative or complementary embodiments, security features can be provided through or built into the app. For example, the phone can implement a security control (e.g., password, PIN, code, pattern, biometric scan, and others) that can prevent extension of jacks, retraction of jacks, initial leveling, re-leveling, energizing of the six-axis digital sensor, transmitting or receiving data to or from the app, or other activity related to leveling or unrelated to leveling (e.g., secure doors or windows) based upon permission granted through successful passing of the security control.

Figure 2:
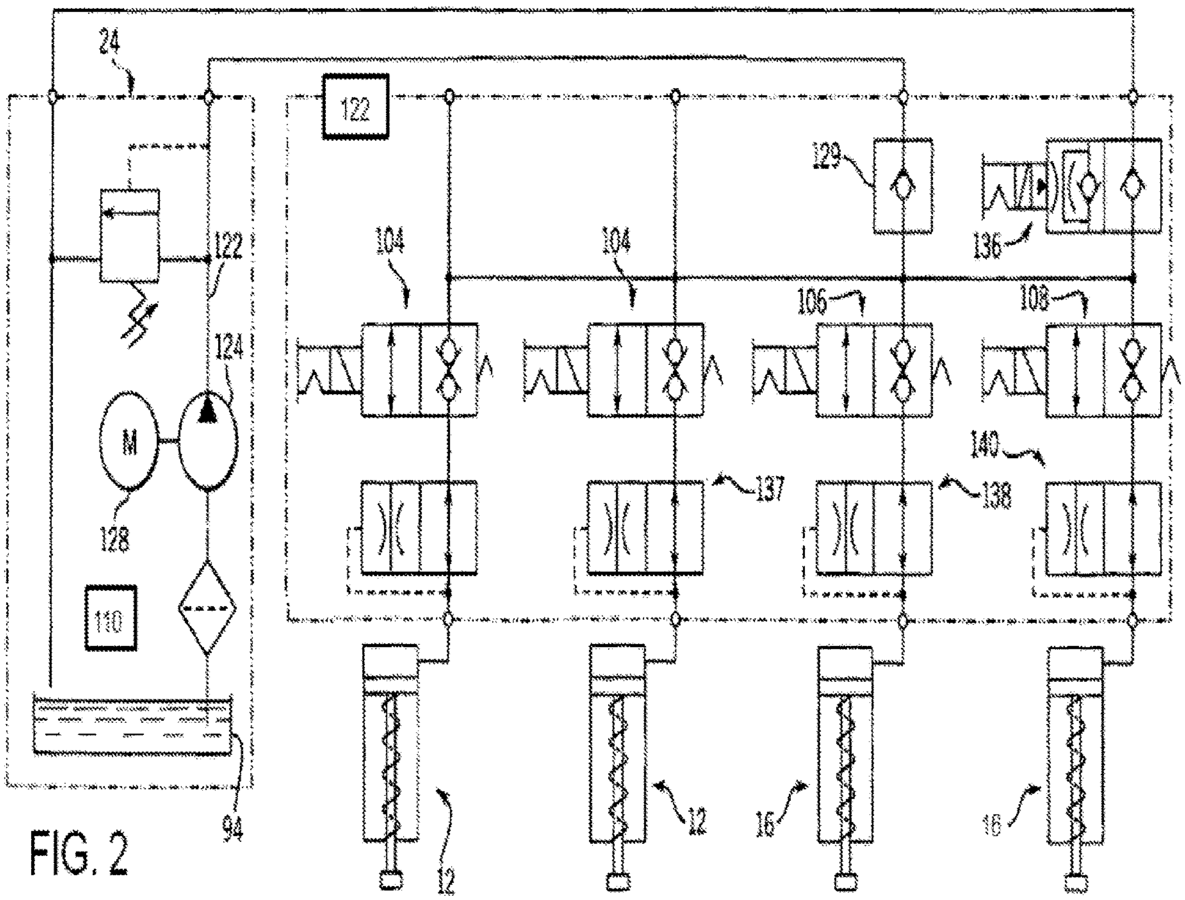
FIG. 2 is a schematic representation of a four-leg vehicle leveling system in accordance with the invention.

Referring now to FIGS. 1 and 2, a system 10 includes pairs of jacks 12 and 16 for leveling a structure. In the embodiment of FIGS. 1 and 2, hydraulic jacks are employed, but other options will be apparent upon review of the disclosures. The pairs of jacks 12 and 16 can be operated in parallel or independently as individual jacks. In embodiments where jacks are operated in pairs, each pair of jacks 12 and 16 can be in continuous fluid communication.

System 10 includes a multi-axis digital sensor 122, which may be mounted to the vehicle in any satisfactory location. As illustrated, multi-axis digital sensor 122 is mounted to one of the frame members, such as 18. Multi-axis digital sensor 122 can be physically or logically interposed between actuator assembly 24 and a controller. Multi-axis digital sensor 122 provides data about the angular orientation and rates of change with respect to the structure to a controller. System 10 can further include a control panel 124 to facilitate user interaction with the system.

Actuator assembly 24 includes a controller 110 which receives signals from multi-axis digital sensor 122 to provide control signals to, e.g., motor assembly 96 for control of pairs of jacks 12 and 16. Controller 110 and/or multi-axis digital sensor can communicate by any suitable wired or wireless means.

Flow control valve 104 and retraction restricting valve 137 control the flow of hydraulic fluid through passages in an associated valve block to both pairs of jacks 12 and 16. Common passages can include branch points from which hydraulic fluid can be supplied to pairs of jacks 12 and 16 through different passages. Although FIG. 2 shows a branch point being located within the valve block, it may be desirable to locate branch points external to the valve block. Because there are no control valves between the jacks of the pair of jacks 12, the hydraulic fluid pressure in both will equalize during operation.

Pairs of jacks 12 and 16 can be mounted on longitudinal frame members 22 and 18, respectively, at a location close to the front transverse frame member 14. Transverse frame member 28 is located opposite transverse frame member 14. Various lines 50 can provide hydraulic fluid or other operative connectivity between components of system 10. To provide fluid, motor assembly 96 is connected to one or more frame members. Motor assembly 96 includes motor 128 and can provide hydraulic fluid from reservoir 94.

Various valves can assist with management of hydraulic fluid, and can be controlled automatically by their own function, automatically by a controller, or manually. Valves depicted in FIG. 2 include flow control valves 104, 106, and 108, check valve 129, retract control valve 136, etc. Alternative arrangements can be utilized where a different hydraulic structure or other technology (e.g., electro-mechanical jacks) is employed.

FIGS. 1 and 2 illustrate a four-leg operating vehicle leveling system. While various lines and controls are illustrated as coupling or supporting specific jacks or arrangements, these figures are for illustrative purposes only, and alternative or complementary embodiments connecting, coupling, or permitting interaction between different elements is embraced hereunder. There can be more or fewer than four jacks, and in embodiments including four jacks, less than four jacks, or more than four jacks, all jacks can be actuated independently or in pairs along an axis. In an embodiment there can be six jacks, eight jacks, or more. In an embodiment, odd numbers of jacks can be employed.

Figure 3:
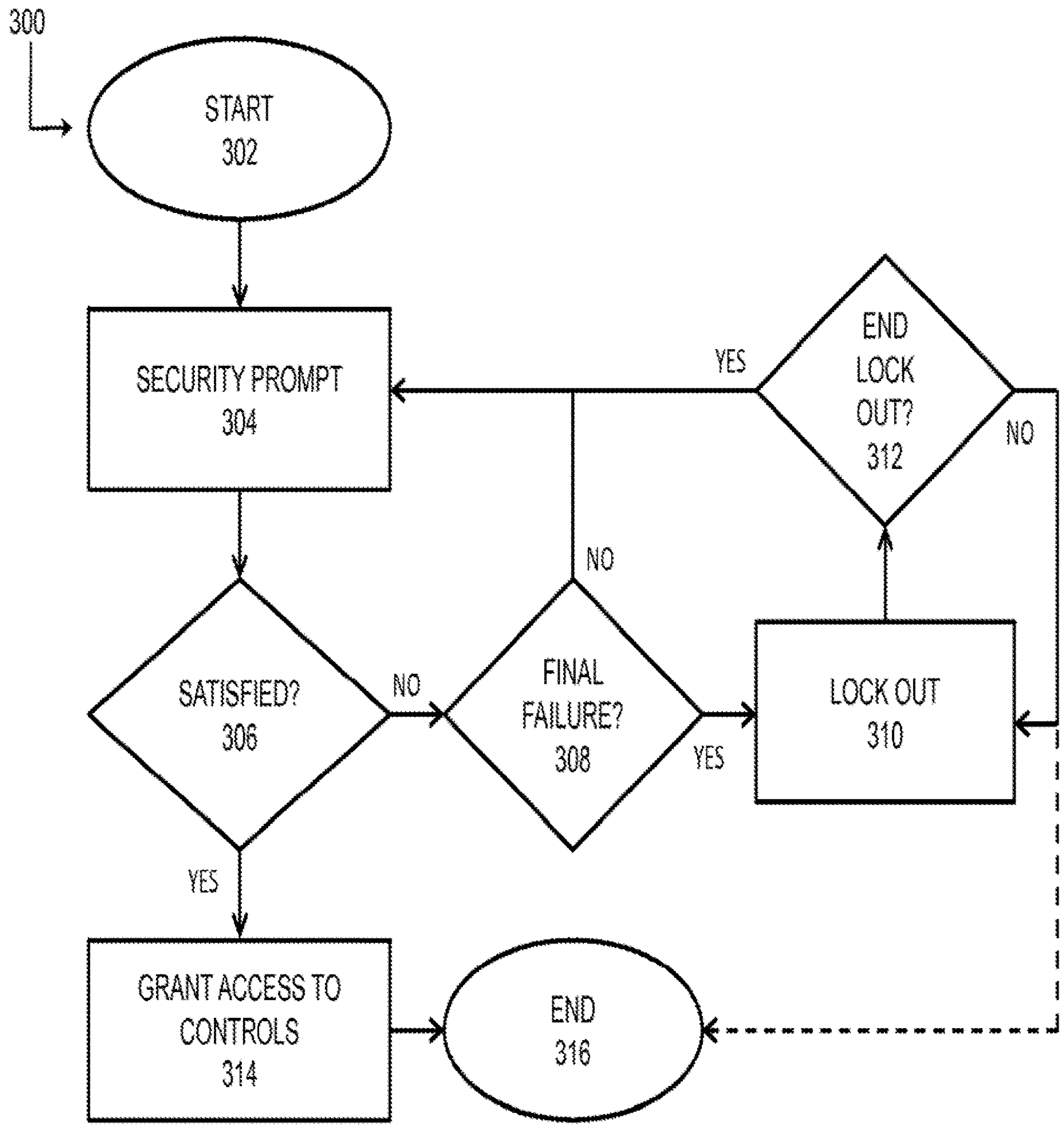
FIG. 3 is a flow chart illustrating a security feature for a jack-leveled vehicle.

FIG. 3 illustrates a flowchart depicting a methodology of securing a power-leveled structure. Methodology 300 begins at 302 and proceeds to 304 where a security prompt is provided. The security prompt can be provided on a dedicated user interface or control panel (e.g., leveling interface for controlling hydraulic or electro-mechanical leveling apparatus in structure), a shared user interface or control panel (e.g., a vehicle dashboard or onboard computer for structure to be leveled), or a third-party device capable of use as an interface (e.g., mobile device or computer with app for communicating with controller and/or six-axis digital sensor installed).

At 304, a determination is made as to whether the security prompt is satisfied. If the prompt is satisfied (e.g., correct password, PIN, code, pattern, biometric input), methodology 300 proceeds to 314 where access is granted to the controls. At 314, the user can view or modify controls in accordance with the permissions and/or controller capabilities. In embodiments, there can be two or more permission levels, such as where a first response to a security prompt at 304 permits the user to view jack or level status, but not transmit controls to modify jack operation or level status. A second security level can permit viewing and modification. After use of the controls is complete subsequent to access being granted at 314, methodology 300 ends at 316.

If the security prompt at 306 is not satisfied, methodology 300 proceeds to 308 where a determination is made as to whether this is a final failure. A final failure may be a first wrong security attempt in more secure systems, or a subsequent wrong security attempt in less secure systems that permit users multiple attempts before lockout. If the determination at 308 returns that the failure to satisfy the security prompt at 304/306 was not a final failure, methodology 300 recycles to 304 where the security prompt is re-presented.

If 308 returns a final failure, methodology 300 advances to 310 where a lockout occurs. The lock out can prevent one or more of viewing of structure level information, modifying structure level status through interaction with the controller, or other aspects. In an embodiment, automatic control can continue (e.g., controller re-levels structure due to settling) without permitting any user access to information or control of such.

After lock out at 310, a determination is made at 312 if the lock out should end (e.g., expiration of timer, keys inserted in ignition, manual override, other condition). If the determination at 312 returns positive, methodology 300 may recycle to 304 (or any other step such as 302). However, if the lockout has not ended, methodology 300 can remain at 310, or alternatively proceed to 316 and end in a lock out condition. In this way, structure tampering, theft, and other unauthorized activities can be discouraged or prevented.

Figure 4:
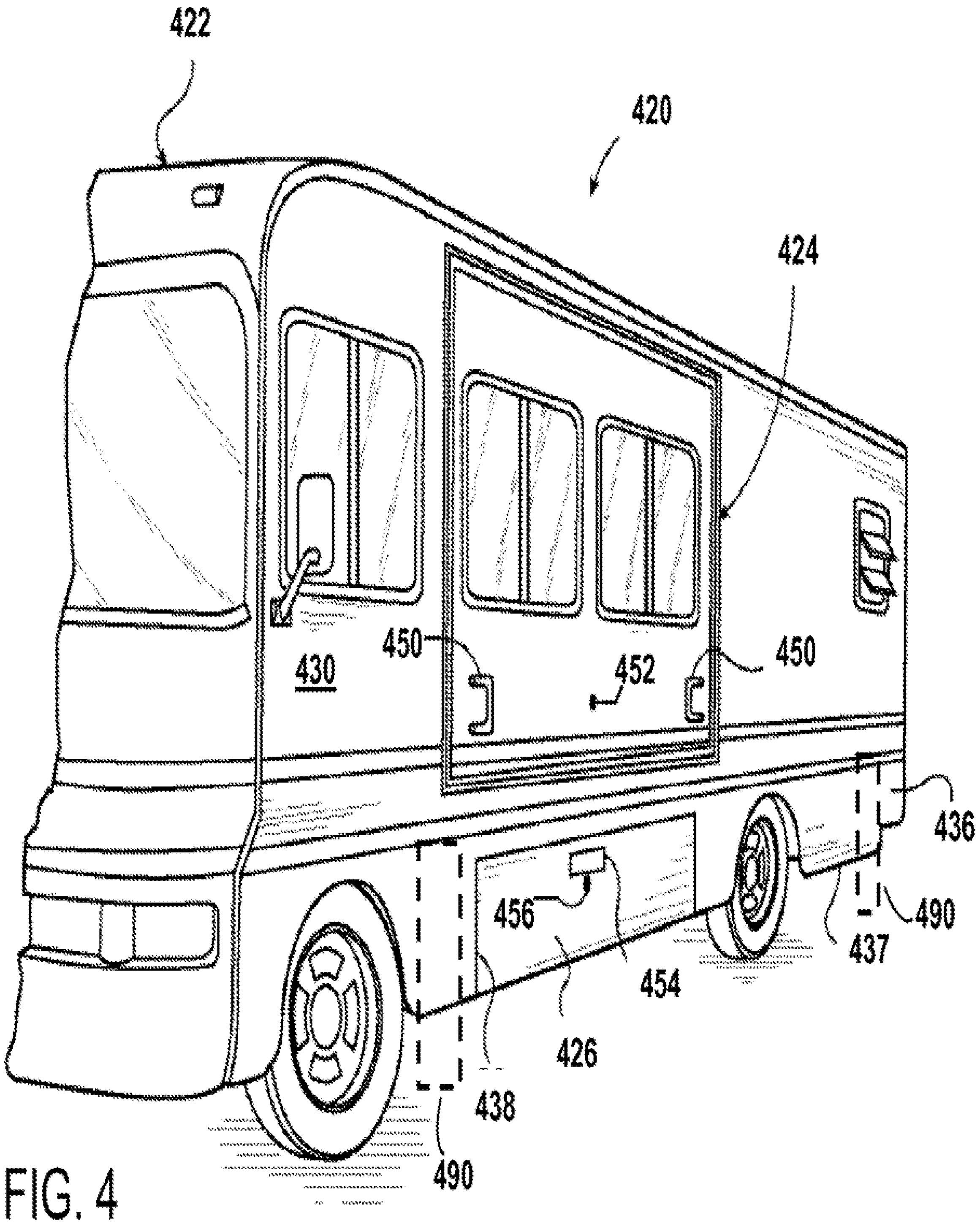
FIG. 4 is a diagram of a jack-leveled vehicle.

FIG. 4 illustrates an example embodiment of a vehicle 420 capable of leveling using the aspects described. Vehicle 420 includes vehicle body 422 including a slideout unit 424. Vehicle 420 further include storage slideout units 426 and skirt 436. Vehicle body 422 is defined by, e.g., left side wall 430, lower edge 437, and opening 438. Aspects also illustrated include handles 450, lock 452, handle 454, and lock 456.

Vehicle 420 can include one or more jacks 490 for leveling at least a portion of vehicle 420. Jacks 490 can be separate components attached to portions of the structure of vehicle 420 (e.g., standalone jacks attached to a vehicle chassis) or embedded within other components (e.g., built into suspension or movable portions of axles of vehicle 420). Jacks 490 can be powered by one or more techniques (e.g., hydraulic, electro-mechanical). Jacks 490 need not be identical, and may be arranged in asymmetrical manners (e.g., to support slideout unit 424 when extended). Jacks 490 are actuated at least in part by a controller which receives feedback from a six-axis digital sensor to assist with the leveling and stability of vehicle 420 when vehicle 420 is parked.

In alternate embodiments, a ground-engaging surface of the jacks 12, 16 may be formed in a variety of sizes and from a variety of materials in order to provide stability between the ground and the jacks 12, 16. For example, the ground-engaging surface of the jacks 12, 16 may include grips made of rubber or other suitable material which provides maximum stability between the ground and the jacks 12, 16. Further examples of ground-engaging surfaces of jacks 12, 16 include surfaces with greater surface area for more unstable ground so as to maximize the distribution of force upon the ground and maximize stability between the ground and the jacks 12, 16.

Still further alternate embodiments include a hinge connecting jacks 12, 16 to the longitudinal frame members 18, 22. In this way, the jacks 12, 16 will be able to further maximize stability through the use of one or more pistons by counteracting any weather forces in addition to providing stability upon an uneven surface, such as an incline or decline. For example, the hinges (or other angular displacement elements) on jacks 12, 16 allow the jacks 12, 16 to move in additional manners and deviate from a relatively fixed arrangement with respect to longitudinal frame members 18, 22 in the event that desired stability may be achieved through an alternate arrangement in which the jacks 12, 16 are angled away from longitudinal frame members 18, 22 and the one or more pistons assist in stabilizing the jacks 12, 16. In such arrangements, doors, windows, or angled wall portions can be provided to avoid contact between other components and jacks 12, 16 when extended on angle. Further, jacks 12, 16 can be attached to an angular displacement motor which controls the rotation or angle at which one or more of jacks 12, 16 extend. Such an event may include a period of forceful winds in which maximum stability would be impossible if the jacks 12, 16 were in a rigid, perpendicular arrangement with longitudinal frame members 18, 22. Still further, the portion of the jacks 12, 16 connecting the body of the jacks 12, 16 to the ground-engaging surface of the jacks 12, 16 may also include an additional hinge and one or more pistons to provide yet another means of maximizing stability upon an uneven surface or in the wake of a counteracting force. In such arrangements, it would be advantageous for the jacks 12, 16 to be mounted on the external surface of a vehicle 420 or on a moveable panel located on the vehicle 420, but those skilled in the art will recognize that a variety of arrangements may be utilized, such as the jacks 12, 16 being located under the chassis of the vehicle 420.

In embodiments permitting grounding of jacks 12, 16 at an angle relative to the primary surfaces of vehicle body 422, controller 110 or other components can control loading and unloading of jacks 12, 16 based on the angles. In embodiments, one or more angular measuring components can be associated with one or more jacks 12, 16 capable of being extended at an angle. In alternative embodiments, jack loading sensors (or motor loading sensors) can detect loads and load components on respective elements with which they are coupled. In this manner, controller 110 or other components can limit stroke length or the angle (with respect to, e.g., a component of vehicle body 422, the direction of gravity, the ground, a plane defined by the vehicle based on its resting on uneven ground, etc.) of jacks 12, 16 to prevent configurations in which not all jacks can be grounded or one jack or associated motor will be overloaded. Thus, angular arrangements can be assumed without exceeding safety factors for jack loading (in total magnitude or with respect to particular force component) or the balance of vehicle 420, or without exceeding the capabilities of an associated motor or other component. In embodiments, an angular solution can be calculated based on the position of vehicle 420, surrounding terrain, and environmental conditions, and the jacks can be extended at various angles during loading in response.

Figure 5:
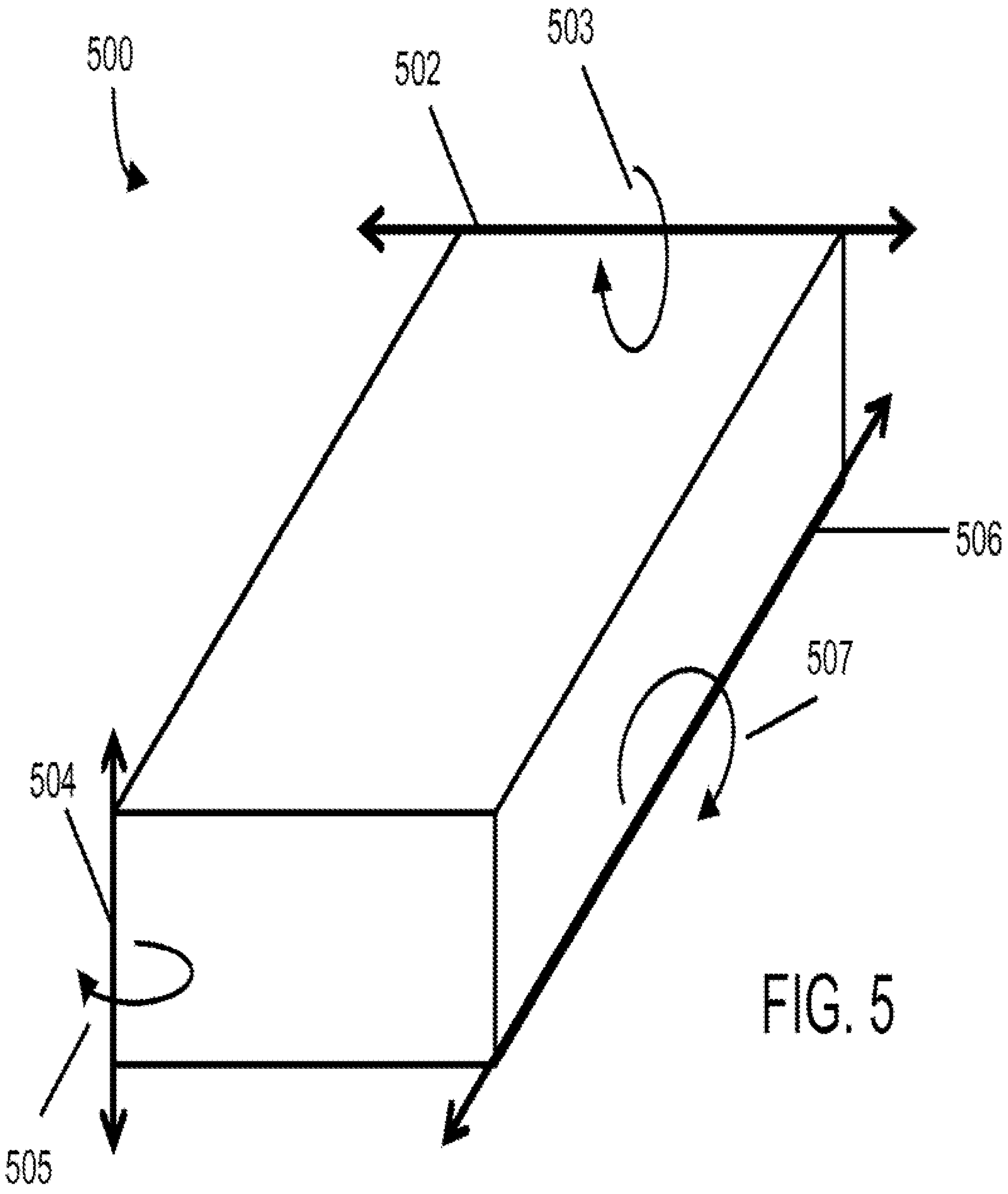
FIG. 5 is a diagram of axes of a vehicle.

FIG. 5 illustrates a diagram 500 of the axes of a vehicle. Longitudinal pitch axis 506 extends in a direction parallel to a straight line extending from a front of the vehicle to a back of the vehicle. Longitudinal pitch axis 506 runs along the same line as longitudinal frame member 22, as shown in FIG. 1. Lateral roll axis 502 extends in a direction parallel to a straight line extending from a left side of the vehicle to a right side of the vehicle. Lateral roll axis 502 runs along the same line as transverse frame member 28, as shown in FIG. 1. Normal axis 504 is shown as the final dimension. FIG. 5 also illustrates rotational axes 503, 505, and 507, describing all six axes that can be employed in a six-axis digital sensor. In various embodiments, fewer axes in various subsets and combinations can be employed by in a multi-axis digital sensor.

Figure 6:
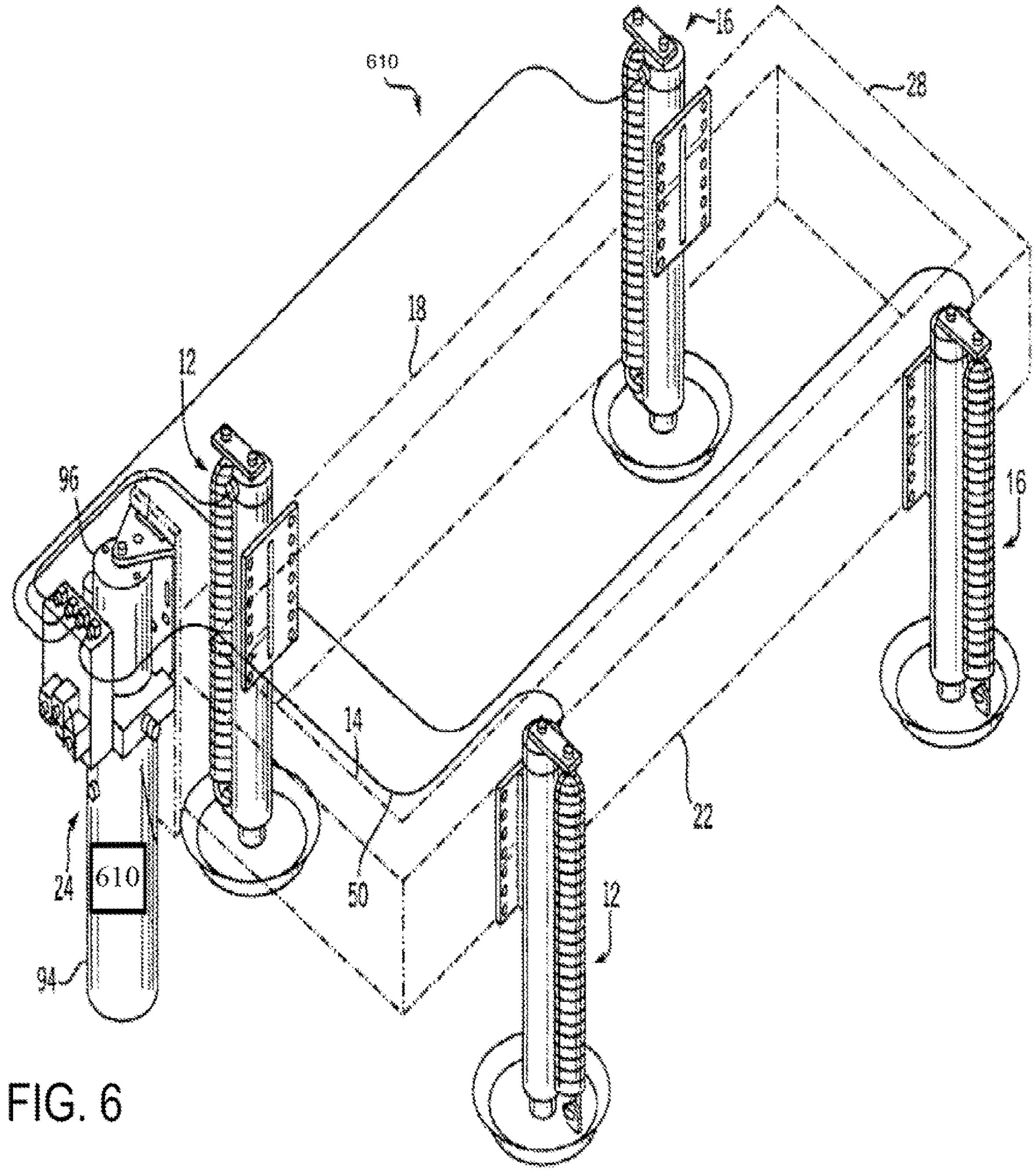
FIG. 6 is an isometric view of another vehicle leveling system installed on the frame of a vehicle such as a recreational vehicle.
Figure 7:
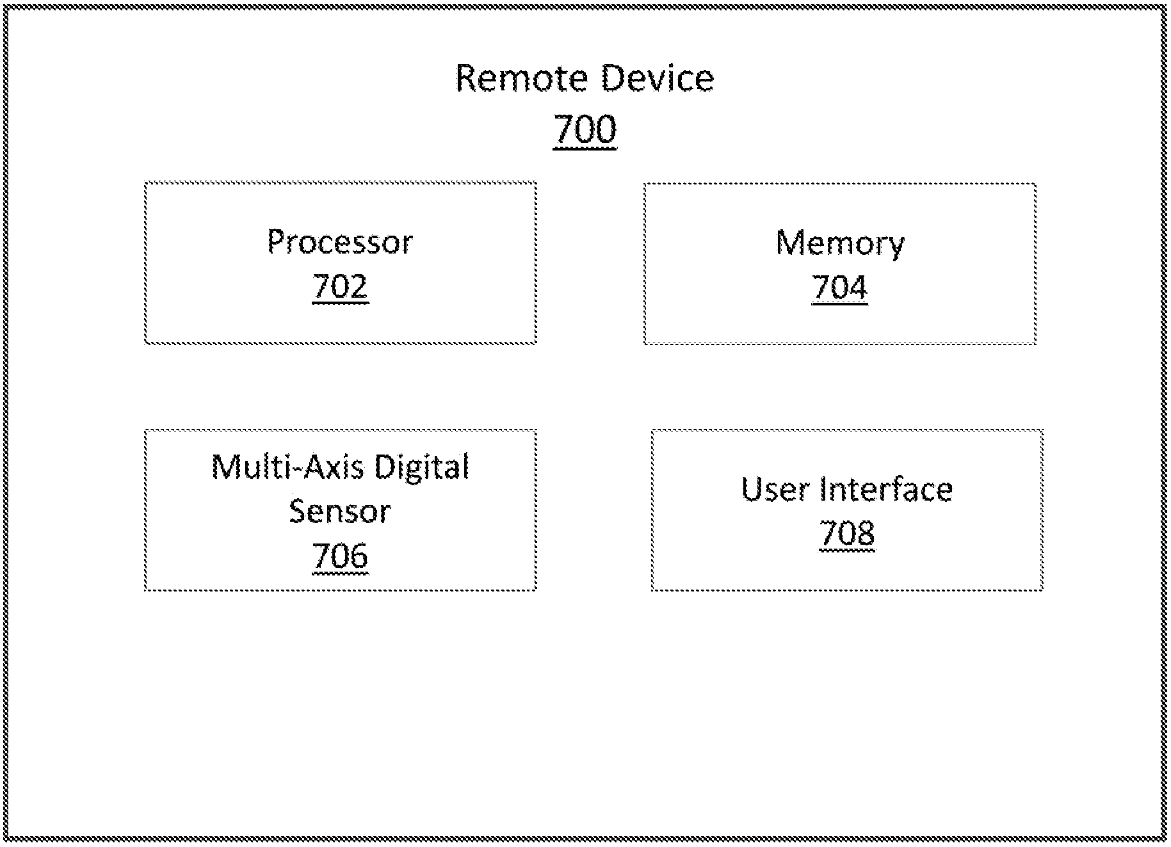
FIG. 7 is a block diagram of a remote device of a vehicle leveling system.
Figure 8:
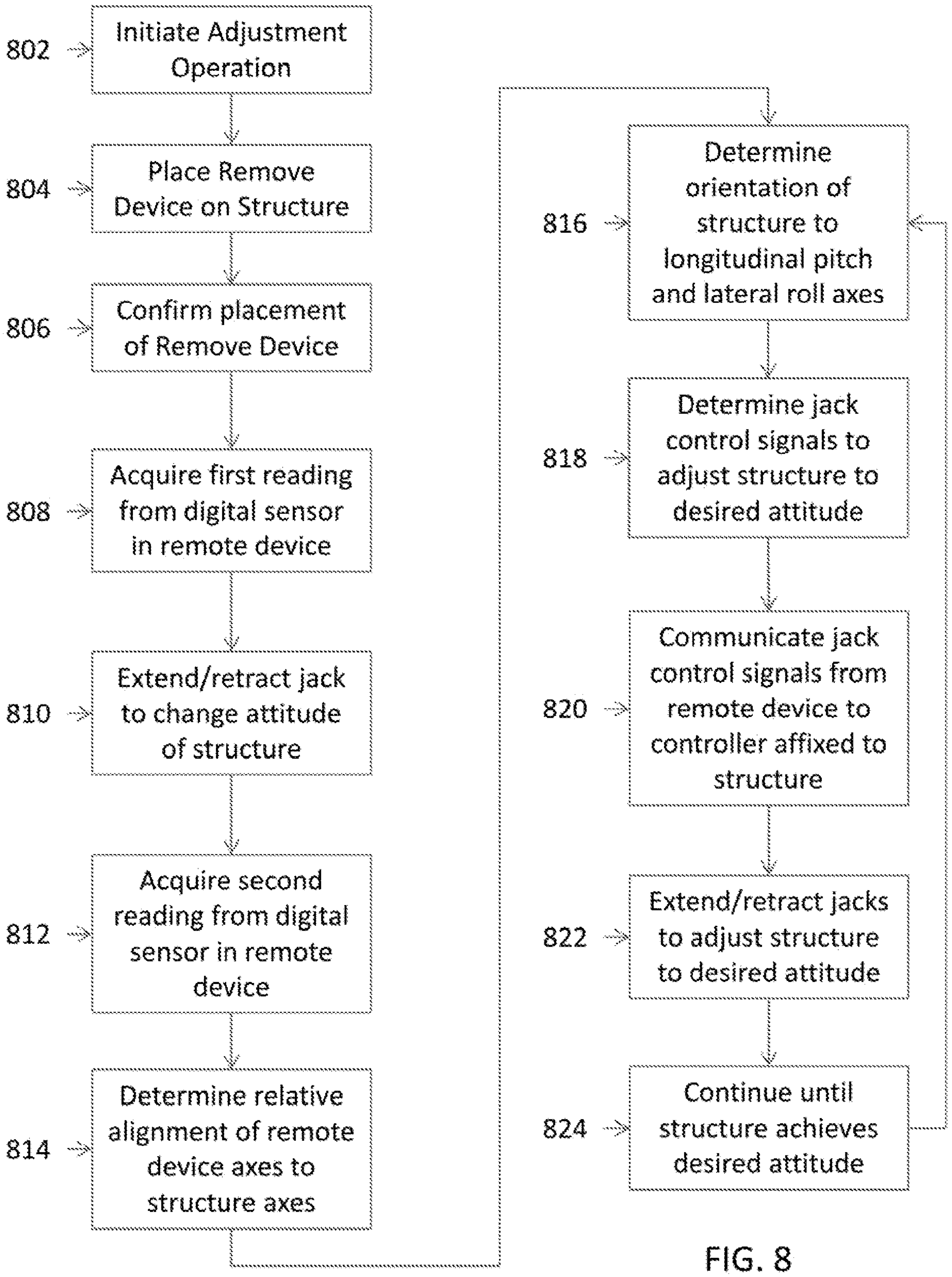
FIG. 8 is a flow chart illustrating an exemplary vehicle attitude adjustment process using the vehicle leveling systems shown in FIGS. 6 and 7.

Referring now to FIGS. 6-8, a vehicle leveling assembly with a remote device is further illustrated. As previously discussed, some embodiments of the presently disclosed vehicle leveling assembly include a remote device, which may be a "smart phone" or similar mobile device, such as a tablet computer. The remote device includes an "app" which provides certain functionality with respect to the leveling system. FIG. 6 illustrates a system 610 substantially similar to the system 10 illustrated in FIG. 1. In contrast to the system 10 of FIG. 1, the system 610 includes a controller 610, but does not include a multi-axis digital sensor mounted to the frame of the vehicle. The system 610 includes one or more jacks as discussed above capable of being extended or retracted to adjust the attitude of the vehicle structure.

Referring to FIG. 7, the system 610 includes a remote device 700, such as illustrated in FIG. 7. In various embodiments, the remote device 700 includes a processor 702, a memory 704, a multi-axis digital sensor 706 and a user interface 708. The remote device 700 is not affixed to the vehicle structure, but rather is freely movable with respect to the vehicle. The processor 702 is operably connected to the memory 704, which is configured to store instructions to be executed on the processor. The remote device 700 may be a mobile device with an integrated multi-axis digital sensor 706 that provides readings from a plurality of axes describing the angular orientation of the remote device. Because the remote device 700 is not affixed to the vehicle structure, the axes of the remote device are typically not aligned with the axes of the structure. The processor 702 is, therefore, configured to use the readings from the digital to calculate an angular orientation of a selected portion of the structure, such as the portion of the structure upon which the remote device is placed. Some prior art systems, in contrast, required elaborate calibration to establish predefined attitudes in an attempt to level discrete portions of the structure. The presently disclosed system, in contract, enables leveling of any portion of the structure selected by the placement of the remote device. The system determines that the selected portion of the structure has achieved a leveled (or other desired attitude) based on the multi-axis digital sensor of the remote device.

The remote device 700 wirelessly communicates with the controller 610. As previously noted, the wireless communication may be achieved using BlueTooth™, WiFi™ or other radio frequency communication technologies. The remote device 700 and the controller 610 may each contain a transmitter and receiver, or transceiver, to enable such communication. In operation, the processor 702 receives the reading from the digital sensor and determines jack control signals based on those readings. The jack control signals are communicated to the controller 610 which cause the one or more jacks to extend or retract to move the selected portion of the structure into a level or other desired attitude. In contrast to the controller 110, the controller 610 may be substantially simplified. In one embodiment, the controller 610 includes a transceiver as previously discussed and control relays operable to cause the extension or retraction of each of the jacks. By reducing the complexity of controller 610, the cost of the controller 610 and the resulting system may be reduced. Many consumers already own a mobile device suitable for use with the system and by utilizing existing hardware in such mobile device, the extra cost of a digital sensor 122 and the more complex controller 110 may be eliminated. In some embodiments, the controller 610 receives jack operation data, such as jack extension speed, jack motor power draw, or other monitored parameters associated with operation of the jacks, such as the output of a jack ground contact sensor. The controller 610 may communicate the jack operation data to the remote device 700, which may then be used as additional input for the attitude adjustment operation or for diagnostic or other purposes.

The vehicle leveling assembly using a remote device may include some or all of the features previously discussed, including without limitation, ground detection, signal filtering, and other useful features. The system may also include security features that inhibit the movement of the jacks in response to user input received via the user interface of the remote device, or after the structure has been adjusted to the desired attitude. In any case, the system may inhibit movement of the jacks until a user input is received via the user interface thereby providing control over undesired movement of the structure.

Referring now to FIG. 9, an exemplary flowchart of a vehicle leveling process 800 is illustrated. The illustrated process 800 includes steps which may or may not be included depending upon the desired implementation. The process 800 may begin at step 302 receiving a request to initiate attitude adjustment operation via the user interface 708 of the remote device 700. At step 804, in response to the received request, an instruction is provided to the user to place the remote device on the selected portion of the structure to be leveled. The selected portion may be a table, stove top, bed or any other portion of the structure which the user desires to have leveled by the system. At step 806, a confirmation may be solicited to confirm that the remote device has been placed on the selected portion of the structure prior to commencing an attitude adjustment operation. In other embodiments, the remote device may provide the user with an immediate level option, thereby reducing the number of steps required to initial the attitude adjustment operation. The process 800 at step 808 acquires a reading from the multi-axis digital sensor describing the angular orientation of the selected portion of the structure with respect to at least two axes relative to the remote device. At this step, the orientation of the remote device 700 to the structure may be unknown because the axes of the remote device may not be aligned with the axes of the structure. At step 810, a jack control signal is transmitted to the controller to extend or retract one of the one or more jacks to cause a change in the orientation of the structure. At step 812, a second reading from the multi-axis digital sensor is received reflecting the change in the orientation of the structure caused by the extension or retraction of the selected jack. With this information, at step 814, the system determines the relative alignment of the axes of the remote device to the axes of the structure based on the readings from the digital sensor and the selected jack. In one example, the remote device may be positioned such that its longitudinal and lateral axes are rotated 90 degrees from the longitudinal and lateral axes of the structure. By extending the tongue jack of the structure, the remote device will detect a change in the orientation with respect to its lateral axis (which is aligned with the longitudinal axis of the structure). The direction of change in the lateral axis of the remote device will further determine whether the remote device is oriented 90 degrees clockwise or counterclockwise with respect to the structure. The process of extending/retracting a single jack may be repeated if necessary to uniquely determine the relative orientation of the axes of the remote device to the axes of the structure.

After determining the orientation of the remote device to the structure, the process 800 continues at 816 to calculate the angular orientation of the structure relative to its longitudinal pitch axis and lateral roll axis. Although described as discrete steps for clarity, it will be apparent that the determination of the relative orientation of the remote device and structure and the determination of the structure's orientation with respect to its own axes may be performed in combination. Once the orientation of the structure has been determined, at 818, the jack control signals required to adjust the selected portion of the structure to the desired attitude are determined, and at 820, the jack control signals are communicated to the controller 610 as previously described. At 822, the controller causes the jacks to extend or retract as appropriate in response to the received jack control signals, and the process continues at step 824, until the structure achieves the desired attitude or until is terminated for other reasons (such as determining that the desired attitude cannot be achieved). As shown, in FIG. 8, the process may iteratively determine the jack control signals based on the updated orientation of the structure as indicated by the changing readings from the multi-axis digital sensor. During the process 800, jack operation data may be monitored and communicated from the controller 610 to the remote device 700. For example, jack motor power draw may be monitored and communicated to the remote device 700 to ensure that the jack motors are not drawings excessive power which may damage the system.

While principles and modes of operation have been explained and illustrated with regard to particular embodiments, it must be understood, however, that this may be practiced otherwise than as specifically explained and illustrated without departing from its spirit or scope.

The invention claimed is:

1. A system for correcting an attitude of a structure having one or more jacks affixed about the structure and operable to change the attitude of the structure, the system comprising:

a remote device comprising:

a multi-axis digital sensor that is configured to measure an orientation of a selected portion of the structure at which the remote device is placed, and a processor configured to determine an adjustment of the one or more jacks based on the measurements received from the multi-axis digital sensor; and a controller in wireless communication with the remote device and configured to cause adjustment of the one or more jacks in order to change the attitude of the structure into a desired attitude based on data indicative of the adjustment received from the processor.

2. The system according to claim 1, wherein the processor is a component of the multi-axis digital sensor.

3. The system according to claim 1, wherein the remote device is unattached to the structure.

4. The system according to claim 3, wherein the processor, the multi-axis digital sensor, and the controller are all components of the remote device.

5. The system of claim 1, wherein the remote device is a smart phone or a tablet computer.

6. The system according to claim 1, wherein the multi-axis digital sensor is configured to measure the attitude of the structure with respect to three or more axes.

7. The system according to claim 6, wherein the multi-axis digital sensor is configured to measure the attitude of the structure with respect to at least a longitudinal pitch axis, a lateral roll axis, and a normal axis.

8. The system according to claim 1, wherein the processor is configured to execute a filter algorithm that filters noise from a digital output signal of the multi-axis digital sensor to allow the controller to recognize ground contact with the one or more jacks.

9. The system according to claim 8, wherein the filter algorithm is an adaptive filter algorithm that adjusts a filter value based on an operational mode of the controller, and wherein the operational mode is a ground contact operation or a leveling sequence.

10. The system according to claim 1, wherein the processor is configured to determine a relative alignment of axes of the multi-axis digital sensor to axes of the structure based on the multiple readings acquired by the multi-axis digital sensor.

11. The system according to claim 1, wherein the remote device further comprises a memory configured to store instructions to be executed by the processor.

12. A method for adjusting an attitude of a structure having one or more jacks affixed about the structure and operable to change the attitude of the structure, the method comprising:

using a multi-axis digital sensor to monitor a level of the structure, wherein the multi-axis digital sensor is unattached to the structure; and adjusting an extension distance of the one or more jacks with a controller, wherein the controller is in wireless communication with the multi-axis digital sensor and is configured to modify the extension distance of one or more jacks based on a measured shift in the level of the structure from a zero leveling point.

13. The method according to claim 12, wherein the level of the structure is monitored by the multi-axis digital sensor with respect to at least three axes of the structure.

14. The method according to claim 12, further comprising:

acquiring a first reading from the multi-axis digital sensor;

adjusting the extension distance of the one or more jacks to determine an orientation of the multi-axis digital sensor;

acquiring a second reading from the multi-axis digital sensor; and determining the relative alignment of axes of the multi-axis digital sensor to axes of the structure based on the first reading and the second reading.

15. The method according to claim 12, further comprising:

determining the zero leveling point of the structure.

16. The method according to claim 12, further comprising, via a user interface of a remote device in which the processor is provided and which is remote from the structure:

receiving a request to initiate an attitude adjustment operation, in response to the request, providing an instruction to place the remote device on a selected portion of the structure to be adjusted, and soliciting a confirmation that the remote device has been placed on the selected portion of the structure to be adjusted prior to initiating the attitude adjustment operation.

17. The method according to claim 12, further comprising a processor configured to determine an adjustment of the one or more jacks based on measurements received from the multi-axis digital sensor.

18. The method according to claim 17, wherein the processor and the multi-axis digital sensor are arranged in a remote device.

19. The method according to claim 18, wherein the controller is also arranged in the remote device.

20. The method according to claim 18, wherein the remote device is a smart phone or a tablet computer.

* * * * *